(12) United States Patent
Woersinger et al.

(10) Patent No.: US 9,733,143 B2
(45) Date of Patent: Aug. 15, 2017

(54) SENSOR FOR RECORDING A PRESSURE OF A FLUID MEDIUM

(71) Applicant: Robert Bosch GmbH, Stuttgart (DE)

(72) Inventors: Juergen Woersinger, Maulbronn (DE); Marius Borras, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 14/858,650

(22) Filed: Sep. 18, 2015

(65) Prior Publication Data

US 2016/0084726 A1    Mar. 24, 2016

(30) Foreign Application Priority Data

Sep. 19, 2014 (DE) .................. 10 2014 218 949

(51) Int. Cl.
*G01L 7/00* (2006.01)
*G01L 19/14* (2006.01)
*G01L 19/00* (2006.01)
*G01L 19/06* (2006.01)

(52) U.S. Cl.
CPC ........ *G01L 19/147* (2013.01); *G01L 19/0038* (2013.01); *G01L 19/0609* (2013.01)

(58) Field of Classification Search
CPC .............. G01L 19/0038; G01L 19/147; G01L 19/0609; G01L 19/007; G01L 7/00; G01N 3/12; G01M 15/08; G01F 1/74
USPC ................... 73/756, 700, 37, 114.16, 861.42
See application file for complete search history.

(56) References Cited

U.S. PATENT DOCUMENTS

| | | | | |
|---|---|---|---|---|
| 2008/0142105 A1* | 6/2008 | Zdroik | ................ | F02M 55/025 138/30 |
| 2011/0198171 A1* | 8/2011 | Lux | ..................... | G01L 19/0609 188/266 |
| 2012/0174685 A1* | 7/2012 | Owejan | ............... | G01L 19/0007 73/861.42 |

FOREIGN PATENT DOCUMENTS

DE    102010001963    8/2011

OTHER PUBLICATIONS

Konrad Reif (publisher): Sensoren im Kraftfahrzeug [Sensors in the Motor Vehicle], 1st edition, 2010, pp. 134-136.+.

* cited by examiner

*Primary Examiner* — Michael A Lyons
*Assistant Examiner* — Nigel Plumb
(74) *Attorney, Agent, or Firm* — Norton Rose Fulbright US LLP; Gerard Messina

(57) ABSTRACT

A sensor is provided for recording a pressure of a fluid medium. The sensor includes a sensor housing, a pressure sensor module that is at least partially disposed in the sensor housing, a pressure connection having a pressure channel, and a throttle element for throttling a pressure prevailing in the pressure channel. On a side facing the pressure sensor module, the throttle element has at least one first recessed portion and, on a side facing away from the pressure sensor module, at least one second recessed portion.

11 Claims, 3 Drawing Sheets

SENSOR FOR RECORDING A PRESSURE OF A FLUID MEDIUM

BACKGROUND INFORMATION

The need arises in different areas of technology, such as in natural sciences or medical engineering, to record one or more properties of fluid media. In principle, these can be any physical and/or chemical properties of the fluid media, thus of the gases and/or liquids, such as temperature, pressure, flow properties or the like. Recording a pressure of the fluid medium is an important example that the present invention is not limited to, however. Pressure sensors are known, for example, from Konrad Reif (publisher): *Sensoren im Kraftfahrzeug* ("Sensors in the Motor Vehicle"), 1st edition, 2010, pp. 134-136.

Another pressure sensor is known from the German Published Patent Application No. 10 2010 001 963. The pressure sensor has a sensor housing having a pressure sensor module and a pressure connection having a pressure channel. A throttle element is installed in the area of an opening of the pressure channel. The throttle element is pot-shaped and has an opening at the base thereof.

In spite of the improvements brought about by these sensors, there is still a potential to optimize known sensors. Thus, in the case of the last described pressure sensor, the throttle element must be additionally secured by four laser weld points in the pressure connection to prevent it from falling out accidentally during sensor operation. This significantly increases the manufacturing costs of such sensors.

SUMMARY

Accordingly, a sensor for recording a pressure of a fluid medium is provided that at least substantially overcomes the disadvantages of known sensors, that is less expensive to manufacture and, at the same time, prevents pressure peaks and cavitation effects caused by the formation of vapor bubbles on the sensor chip membrane.

A sensor according to the present invention for recording a pressure of a fluid medium includes a sensor housing, a pressure sensor module that is at least partially disposed in the sensor housing, a pressure connection having a pressure channel, and a throttle element for throttling a pressure prevailing in the pressure channel. On a side facing the pressure sensor module, the throttle element has at least one first recessed portion and, on a side facing away from the pressure sensor module, at least one second recessed portion.

In the context of the present invention, the expressions "first" and "second" are merely used to differentiate the respective components and not to indicate a specific weighting or sequence thereof.

The pressure connection may, in particular, be designed as a pressure connector. The pressure connector may be configured as a single component. Alternatively, the pressure connector may be in the form of two joined-together components. The two components embrace a housing base upon which the sensor housing is mounted and which may be configured in the shape of a hexagon, for example, and a threaded part that is configured on a flow tube for attaching the sensor. In the context of the present invention, a connector is understood to be a short tubular attachment, for example, an at least partially cylindrical attachment, for example, having a round or polygonal cross section. Since, in the context of the present invention, the pressure channel of the pressure connection is at least partially configured in the pressure connection for conveying the medium, and the fluid medium typically has a pressure above atmospheric and/or normal pressure, the connector is also referred to as pressure connector or pressure connection in the context of the present invention.

The present invention provides that a pressure sensor module be a preassembled module having a sensor element that supplies the actual measurement signals as a function of the pressure and/or of the measurement values that are utilized for recording the pressure of the fluid medium, and that it have further components. For example, the sensor element may include a sensor membrane configured as a measuring bridge that has one or a plurality of piezoresistive elements and/or other types of sensitive elements, as is customary for pressure sensors. With regard to other possible embodiments of pressure sensors of this type, reference may be made to the related art described above, in particular to Konrad Reif (publisher): *Sensoren im Kraftfahrzeug* ("Sensors in the Motor Vehicle"), 1st edition, 2010, pp. 134-136. In principle, however, other embodiments are also possible. The other components may be used for signal processing, for example, a gel as protection against the fluid medium and contact, assembly and connection technology components, in particular bonding wires, adhesive agents and the like, a plastic shaped body having stamped grids and condensers. In the case of the signal processing components, it may be a question of an application-specific integrated circuit—ASIC, for example, that is also known as a "custom chip." A circuit of this kind is an electronic circuit that is realized as an integrated circuit. The sensor element and the integrated circuit (ASIC) may be located on two separate chips or on one shared chip. For example, to record a pressure, the pressure sensor module may have a glass base, as well as a silicon chip configured thereon as a sensor element, upon whose surface a measuring bridge is provided, for example, that may be constructed in the form of a Wheatstone bridge of piezoresistive resistance elements, for example. The membrane required for the pressure measurement may be fabricated by etching the rear side of the silicon chip. The sensor element may be joined to the glass base. It contains at least the measuring bridge.

The first recessed portion and/or the second recessed portion may be groove-shaped. The throttle element may be configured symmetrically relative to a plane extending parallel to the side facing the pressure sensor module and the side facing away from the pressure sensor module. The first recessed portion and the second recessed portion may oppose one another with the plane extending therebetween. The throttle element may be configured between the pressure sensor module and an opening of the pressure channel. The pressure channel may be cylindrically formed about a cylinder axis. The first recessed portion and/or the second recessed portion may extend essentially orthogonally to the cylinder axis. The throttle element may essentially be disk-shaped at one diameter. The first recessed portion and/or the second recessed portion may extend parallel to the diameter completely over a dimension of the side facing the pressure sensor module and/or of the side facing away from the pressure sensor module.

In the context of the present invention, a disk shape is understood to be a shape similar to a disk. A disk is understood to be a cylinder whose radius is significantly larger than the thickness thereof. For example, the radius is larger by at least the factor 2 than the thickness of the cylinder.

The throttle element may have at least two rounded lateral surfaces and at least two opposing flattened lateral surfaces.

The lateral surfaces preferably extend orthogonally to the side of the throttle element facing the pressure sensor module, respectively to the side facing away from the pressure sensor module. The first recessed portion and/or the second recessed portion may extend parallel to a direction that connects the two flattened lateral surfaces. In other words, the first recessed portion and/or the second recessed portion extend parallel to an imaginary line that connects the two flattened lateral surfaces, for example that connects them orthogonally.

The pressure sensor module may feature a sensor chip and a support. The support may be in the form of a glass base, for example. The sensor chip is configured on the support. The throttle element may adjoin the support. The throttle element may be at least partially fabricated of metal, such as of stainless steel, for example, or of plastic.

It is understood that the particular material of the throttle element must be resistant to the fluid medium.

A fundamental idea of the present invention is to manufacture the throttle element symmetrically by stamping or pressing and to press the same in place into the pressure channel. This eliminates the need for a laser welding process and the process monitoring thereof, as well as for a quality monitoring of the remaining parts. The throttle element may be used both in sensors for recording the pressure of the fluid medium, as well as in sensors for recording the pressure and the temperature of the fluid medium. If the throttle element is configured to be symmetrical, a conveyance that is independent of the particular side is possible during assembly. In other words, there is no need for a directional assembly. The throttle element in accordance with the present invention makes possible a simple and less expensive measure for preventing pressure peaks and cavitation effects caused by the formation of vapor bubbles on the silicon chip membrane of the pressure sensor module. Preliminary damage to and mechanical breaks in the silicon chip membrane are thereby prevented.

DETAILED DESCRIPTION

Figure 1:
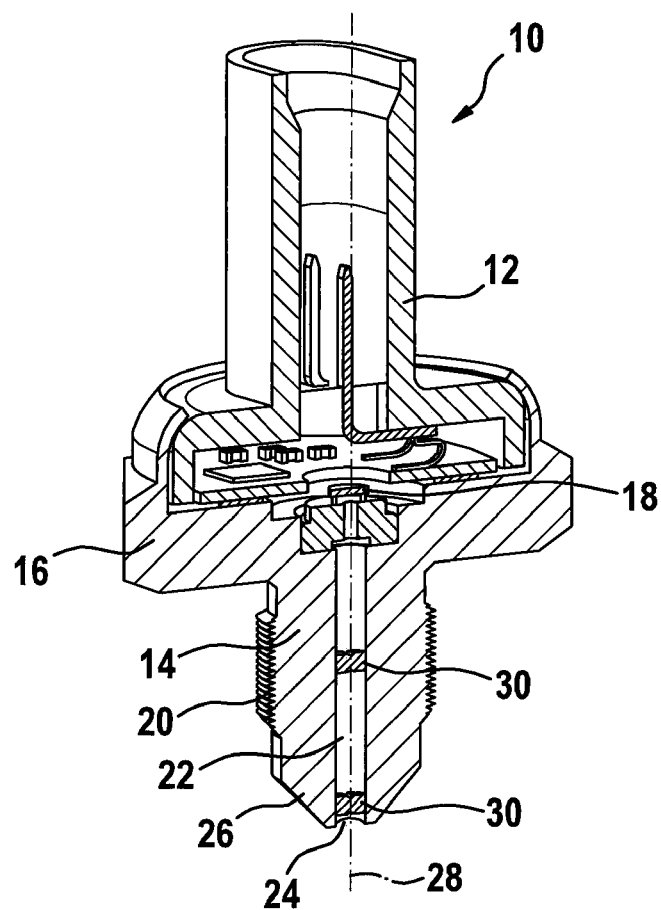
FIG. 1 shows a longitudinal cross-sectional view of a sensor for recording a pressure of a fluid medium in accordance with a first specific embodiment of the present invention.

FIG. 1 is a longitudinal cross-sectional view of a sensor 10 for recording a pressure of a fluid medium. Sensor 10 may be designed, for example, for recording a fuel pressure in a fuel supply line of a combustion engine or exhaust emissions in an exhaust-system branch of a combustion engine. Sensor 10 has a sensor housing 12, a pressure connection 14, a lower housing part 16 in a hexagon shape, and a pressure sensor module 18 for recording the pressure of the fluid medium. Pressure sensor module 18 is at least partially configured within sensor housing 12. Sensor housing 12 is configured on lower housing part 16. Sensor housing 12 is designed, for example, as a connector housing for connecting to an electrical plug connector that is not specifically shown.

Pressure connection 14 may at least be partially fabricated of metal, light metal or of an alloy of the same. Pressure connection 14 may be fabricated of aluminum or of an aluminum alloy, for example.

Pressure connection 14 may be manufactured as a lathed part, die-cast part, cold-formed part or metal injection molded part. Pressure connection 14 may be configured to be rotationally symmetric about an axis of rotation. Pressure connection 14 is designed as a cylindrical pressure connector, for example. Pressure connection 14 has an external thread 20 that is provided for connecting the fuel line or that is disposed at another location provided for this purpose. Pressure connection 14 and lower housing part 16 may be formed in one piece or be configured of two joined-together components. Sensor housing 12 is permanently joined to pressure connection 14, respectively to lower housing part 16. Pressure connection 14 has a pressure channel 22. Pressure channel 22 has an opening 24 that is located at an end 26 of pressure channel 14 assigned to the fluid medium. The purpose of pressure channel 22 is to convey the pressurized fluid medium to pressure sensor module 18. Pressure channel 22 may, in particular, be cylindrically disposed about a cylinder axis 28, which, at the same time, may be the rotation axis of pressure connection 14.

In addition, sensor 10 includes a throttle element 30. Throttle element 30 is used for damping high pressure pulses and cavitation effects caused by the formation of vapor bubbles in fluid media. Throttle element 30 is symmetrically designed, as is described in greater detail in the following, and is configured between opening 24 of pressure channel 22 and pressure sensor module 18. As is indicated in FIG. 1, throttle element 30 may be disposed in the area of opening 24, for example, or be located at any location in pressure channel 22.

Figure 2:
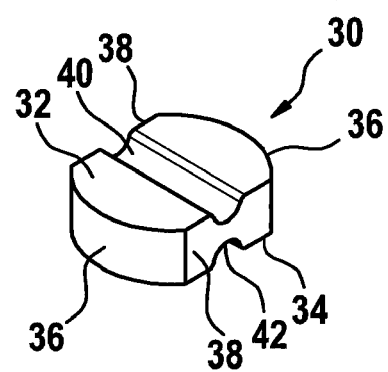
FIG. 2 shows a perspective view of a throttle element of the present invention.

FIG. 2 shows a perspective view of throttle element 30. Throttle element 30 is essentially disk-shaped. Throttle element 30 features a side 32 that faces the pressure sensor module and a side 34 that faces away from pressure sensor module 18. Moreover, throttle element 30 may have at least two rounded lateral surfaces 36 and two flattened lateral surfaces 38. Rounded lateral surfaces 36 and flattened lateral surfaces 38 are configured orthogonally to side 32 facing the pressure sensor module, respectively to side 34 facing away from the pressure sensor module.

Figure 3:
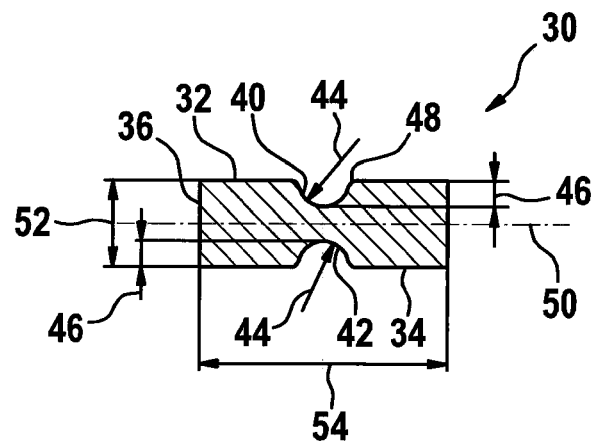
FIG. 3 shows a cross-sectional view of the throttle element.

FIG. 3 shows a cross sectional view of throttle element 30. On side 32 facing the pressure sensor module, throttle element 30 has at least one first recessed portion 40 and, on side 34 facing away from the pressure sensor module, at least one second recessed portion 42. First recessed portion 40 and/or second recessed portion 42 may be groove-shaped. For example, first recessed portion 40 and second recessed portion 42 feature a circular cross section having a radius 44 of 0.25 mm to 0.35 mm, for instance 0.30 mm. First recessed portion 40 and second recessed portion 42 may, in particular, feature a semicircular cross section, so that radius 44 corresponds to a depth 46 of first recessed portion 40, respectively of second recessed portion 42. As rounded portions having a radius 48 of 0.095 mm to 0.15 mm, for instance 0.1 mm, first recessed portion 40 and/or second recessed portion 42 may thereby merge transitionally into side 32 facing the pressure sensor module, respectively side 34 facing away from the pressure sensor module. As mentioned above, throttle element 30 has a symmetrical form. In particular, throttle element 30 is disk-shaped and formed to be symmetrical relative to a plane 50. Plane 50 extends parallel to side 32 facing the pressure sensor module and side 34 facing away from the pressure sensor module. Thus, plane 50 constitutes a center plane. First recessed portion 40 and second recessed portion 42 oppose one another with plane 50 extending therebetween. Throttle element 30 has a height 52 of 1.0 mm, for example. Moreover, due to the disk shape thereof, throttle element 30 has a diameter 54 of 2.95 mm to 3.05 mm, for example 3.0 mm.

Figure 4:
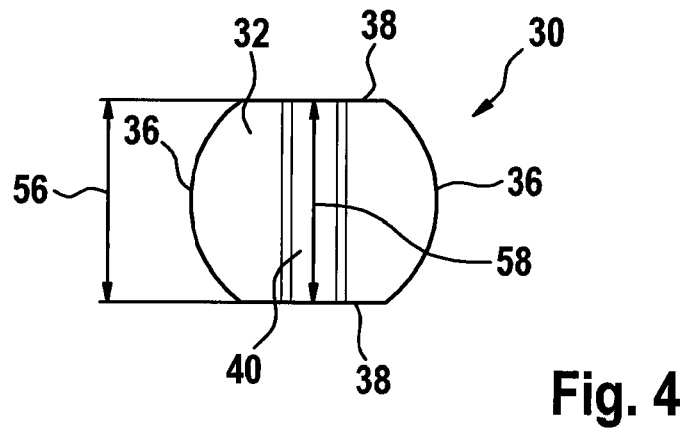
FIG. 4 shows a plan view of the throttle element.

FIG. 4 shows a plan view of throttle element 30. As is readily discernible, first recessed portion 40, respectively second recessed portion 42 extend completely through side 32 facing the pressure sensor module, respectively side 34 facing away from the pressure sensor module.

First recessed portion 40 and second recessed portion 42 extend parallel to diameter 54 completely over a dimension 56 of side 32 facing the pressure sensor module, respectively of side 34 facing away from the pressure sensor module. In particular, first recessed portion 40 and second recessed portion 42 extend parallel to a direction that connects the two flattened lateral surfaces 38. It is also discernible that first recessed portion 40 and second recessed portion 42 each lead into a flattened lateral surface 38. Throttle element 30 has a length 58, that is a dimension of throttle element 30 orthogonally to flattened lateral surfaces 38, for first recessed portion 40 and second recessed portion 42 of 2.35 mm to 2.45 mm, for example 2.4 mm.

Figure 5:
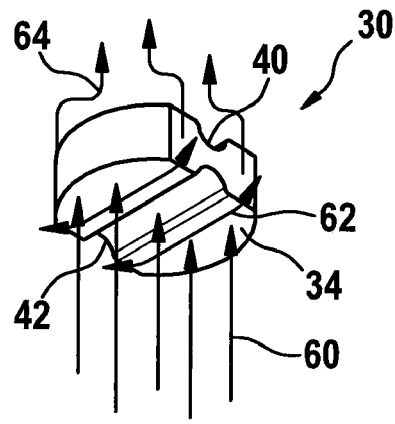
FIG. 5 shows a perspective view of the throttle element for illustrating the principle of operation.

FIG. 5 shows a perspective view of throttle element 30 for illustrating the principle of operation. Discernible is an oncoming flow toward throttle element 30 and incident to side 34 facing away from the pressure sensor module. Arrows 60 indicate exemplarily occurring high pressure pulses that are inherent to the system. Because of the special geometry of throttle element 30 in the form of a double-grooved sheet-metal section, the pressure pulses are deflected and attenuated multiple times in the area of second recessed portion 42 and flattened lateral surface 38, as indicated by arrows 62, 64. Cavitation bubbles produced by vacuum-pressure effects inherent to the system and the associated formation of vapor bubbles, as well as by returning pressure waves, burst at the latest in a dead volume (not specifically shown) downstream of throttle element 30 and are thus kept away from pressure sensor module 18.

Figure 6:
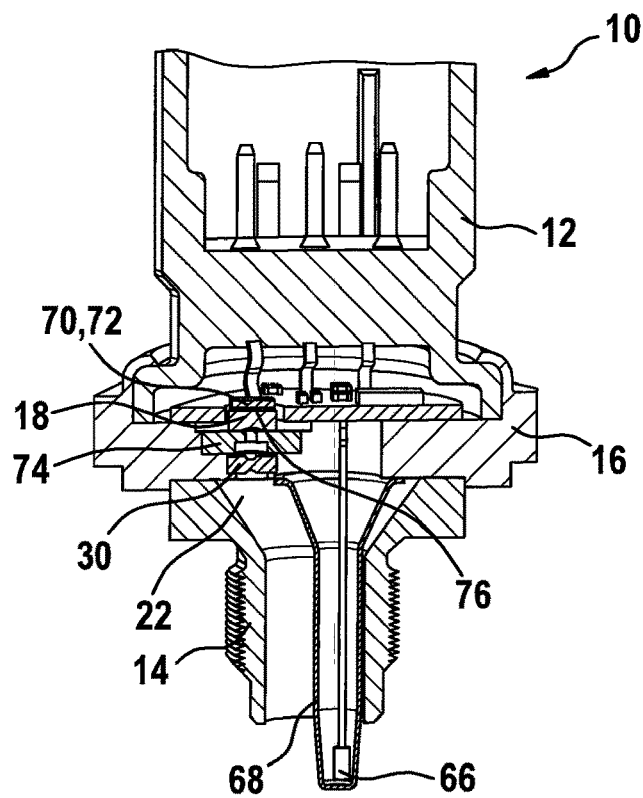
FIG. 6 shows a longitudinal cross-sectional view of a sensor for recording a pressure and a temperature of a fluid medium in accordance with a second specific embodiment of the present invention.

FIG. 6 shows a longitudinal cross-sectional view of a sensor 10 for recording a pressure and a temperature of a fluid medium in accordance with a second specific embodiment of the present invention. In the following, merely the differences from the first specific embodiment are described, and the same components are denoted by same reference numerals. Sensor 10 has a temperature sensor 66 for recording a temperature of the fluid medium. Temperature sensor 66 may be configured as an NTC (negative temperature coefficient) sensor, for example. Temperature sensor 66 is disposed in a sleeve 68. Sleeve 68 is joined to lower housing part 16. Sleeve 68 may be fabricated of a light metal, metal or of an alloy of the same. Sleeve 68 is made of stainless steel, for example. Sleeve 68 may be fabricated as a deep-drawn part or as a cold-formed part, for example. Sleeve 68 protrudes from pressure connection 14, respectively projects out of the same.

Figure 7:
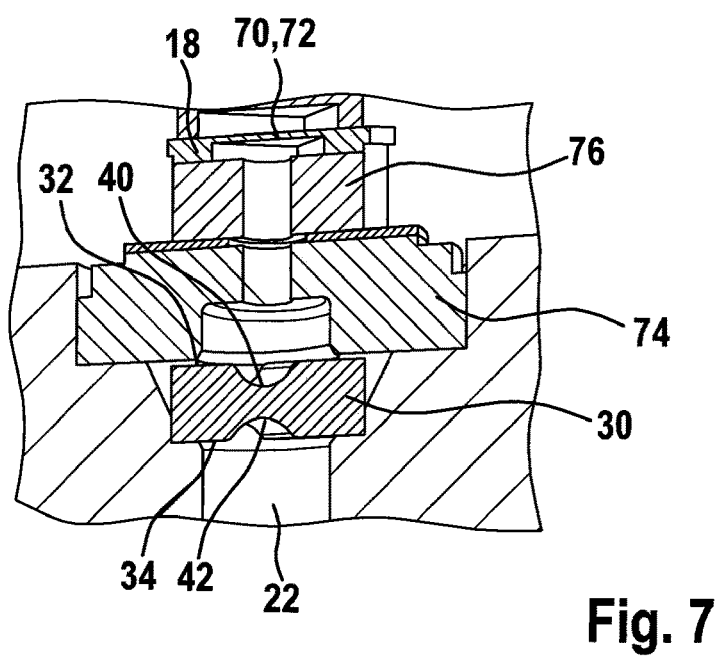
FIG. 7 shows an enlarged detail view of the sensor for recording a pressure and a temperature of a fluid medium.

FIG. 7 shows an enlarged detail of sensor 10 of FIG. 6. In addition, pressure sensor module 18 has a sensor chip 70 having a sensor membrane 72 and a support 74. Sensor chip 70 is configured on support 74, for example via a glass base 76. Discernible, in particular, is the configuration of pressure sensor module 18, of support 74, of throttle element 30, as well as of pressure channel 22 in pressure connection 14. As can be seen from FIG. 7, throttle element 30 adjoins support 74. The principle of operation of throttle element 30 of sensor 10 of the second specific embodiment does not fundamentally differ from that of throttle element 30 of sensor 10 of the first specific embodiment. In the case of sensor 10 of the second specific embodiment, the dead volume is located directly behind throttle element 30 in support 74. Accordingly, pressure waves and cavitation bubbles are kept away from sensor membrane 72. This prevents any preliminary damage to and mechanical breaks in sensor membrane 72.

What is claimed is:

1. A sensor for recording a pressure of a fluid medium, comprising: a sensor housing; a pressure sensor module that is at least partially disposed in the sensor housing; a pressure connection having a pressure channel; and a throttle element for throttling a pressure prevailing in the pressure channel, wherein: a first face of the throttle element has at least one recess by which the first face includes a raised portion that faces the pressure sensor module and a recessed portion that faces the pressure sensor module and that is at a further distance from the pressure sensor module than the raised portion and, a second face of the throttle element, which is opposite to the first face, has at least one second recess by which the second face includes a recessed portion that faces away from the pressure sensor module and a raised portion that faces away from the pressure sensor module and that is at a further distance from the pressure sensor module than the recessed portion.

2. The sensor as recited in claim 1, at least one of the first recess and the second recess is groove-shaped.

3. The sensor as recited in claim 1, wherein the throttle element is configured symmetrically relative to a plane extending parallel to the side facing the pressure sensor module and the side facing away from the pressure sensor module.

4. The sensor as recited in claim 3, wherein the first recess and the second recess oppose one another with the plane extending therebetween.

5. The sensor as recited in claim 1, wherein the throttle element is configured between the pressure sensor module and an opening of the pressure channel.

6. The sensor as recited in claim 1, wherein the pressure channel is cylindrically formed about a cylinder axis, and wherein at least one of the first recess and the second recess extends essentially orthogonally to the cylinder axis.

7. The sensor as recited in claim 1, wherein:
the throttle element is disk-shaped at one diameter; and
at least one of the first recess and the second recess extends parallel to the diameter completely over at least one of:
a dimension of the side facing the pressure sensor module; and
a dimension of the side facing away from the pressure sensor module.

8. The sensor as recited in claim 1, wherein:
the throttle element includes two rounded lateral surfaces that are opposite each other and two flattened lateral surfaces that are opposite each other;
the two rounder lateral surfaces and the two flattened lateral surfaces all extend from the first face to the second face; and a longitudinal extension of at least one of the first recess and the second recess extends parallel to a direction that connects the two flattened lateral surfaces.

9. The sensor as recited in claim 1, wherein the pressure sensor module includes a sensor chip and a support, the sensor chip being disposed on the support, and the throttle element adjoining the support.

10. The sensor as recited in claim 1, wherein the throttle element is at least partially fabricated of one of a metal and a plastic.

11. A sensor for recording a pressure of a fluid medium, comprising:
 a sensor housing;
 a pressure sensor module that is at least partially disposed in the sensor housing;
 a pressure connection having a pressure channel; and
 a throttle element for throttling a pressure prevailing in the pressure channel, wherein:
  the throttle element includes:
   a first external face facing the pressure sensor module and facing away from an inlet of the fuel medium;
   a second external face facing away from the pressure sensor module and facing towards the inlet; and
   four lateral external faces that each extends from the first external face to the second external face;
  a first two of the four lateral external faces are flat and oppose each other;
  a second two of the four lateral external faces are curved about a longitudinal axis and oppose each other, with each of the first two of the four lateral external faces extending from a respective edge of one of the second two of the four lateral external faces to a respective edge of the other of the second two of the four lateral external faces;
  a groove is formed in the first external face that faces the pressure sensor module by which the first external face includes a raised portion that faces the pressure sensor module and a recessed portion that faces the pressure sensor module and that is at a further distance from the pressure sensor module than the raised portion;
  a groove is formed in the second external face that faces away from the pressure sensor module by which the second external face includes a recessed portion that faces away from the pressure sensor module and a raised portion that faces away from the pressure sensor module and that is at a further distance from the pressure sensor module than the recessed portion; and
 each of the grooves longitudinally extends from a first one of the flat lateral external faces to a second one of the flat lateral external faces, upper and lower edges of each of the two flat lateral external faces thereby including respective indents.

* * * * *